United States Patent
Dutta et al.

(10) Patent No.: US 11,533,217 B2
(45) Date of Patent: Dec. 20, 2022

(54) SYSTEMS AND METHODS FOR PREDICTIVE ASSURANCE

(71) Applicant: HEWLETT PACKARD ENTERPRISE DEVELOPMENT LP, Houston, TX (US)

(72) Inventors: Biswadeb Dutta, Chestnut Hill, MA (US); Raúl De Diego Merino, Las Rozas (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/945,734

(22) Filed: Jul. 31, 2020

(65) Prior Publication Data

US 2022/0038330 A1 Feb. 3, 2022

(51) Int. Cl.
*H04L 41/0631* (2022.01)
*H04L 41/0677* (2022.01)
*G06N 3/04* (2006.01)

(52) U.S. Cl.
CPC .......... *H04L 41/065* (2013.01); *G06N 3/049* (2013.01); *H04L 41/064* (2013.01); *H04L 41/0677* (2013.01)

(58) Field of Classification Search
CPC . H04L 41/065; H04L 41/064; H04L 41/0677; G06N 3/049
USPC ........................................................ 709/224
See application file for complete search history.

(56) References Cited

U.S. PATENT DOCUMENTS

| | | | | |
|---|---|---|---|---|
| 9,495,234 B1 * | 11/2016 | Hamman | ................. | H04L 43/50 |
| 10,069,694 B1 * | 9/2018 | Schwartz | ............ | H04L 41/0893 |
| 10,096,030 B1 * | 10/2018 | Hayon | ................. | G06Q 30/016 |
| 10,178,067 B1 * | 1/2019 | Kumar | ..................... | H04L 67/02 |
| 10,326,848 B2 * | 6/2019 | Nath | ........................ | H04L 67/22 |
| 10,361,802 B1 * | 7/2019 | Hoffberg-Borghesani | ................... | |
| | | | | G11B 27/11 |
| 10,367,677 B2 * | 7/2019 | Parkvall | ................ | H04B 7/0617 |
| 10,367,699 B2 * | 7/2019 | Jin | .......................... | H04B 3/46 |
| 10,423,459 B1 * | 9/2019 | Jacques de Kadt | ...... | G06F 9/50 |
| 10,594,718 B1 * | 3/2020 | Deaguero | ............. | G06F 21/552 |
| 10,606,718 B1 * | 3/2020 | Sandlerman | .......... | G06F 11/203 |

(Continued)

FOREIGN PATENT DOCUMENTS

WO WO-2019145049 A1 8/2019

OTHER PUBLICATIONS

M. Thottan and Chuanyi Ji, "Anomaly detection in IP networks," in IEEE Transactions on Signal Processing, vol. 51, No. 8, pp. 2191-2204, Aug. 2003, doi: 10.1109/TSP.2003.814797. (Year: 2003).*

(Continued)

*Primary Examiner* — Melvin H Pollack
(74) *Attorney, Agent, or Firm* — Sheppard Mullin Richter & Hampton LLP

(57) ABSTRACT

Systems and methods are provided for predicting system or network failures, such as a degradation in the services provided by a service provider system or network, a system or network outage, etc. In a discovery phase, failure scenarios that can be accurately predicted based on monitored system events are identified. In an operationalization phase, those failure scenarios can be used to design production run-time machines that can be used to predict, in real-time, a future failure scenario. An early warning signal(s) can be sent in advance of the failure scenario occurring.

20 Claims, 8 Drawing Sheets

(56) References Cited

U.S. PATENT DOCUMENTS

| | | | | |
|---|---|---|---|---|
| 10,650,045 | B2* | 5/2020 | Bequet | G06F 16/90344 |
| 10,652,782 | B1* | 5/2020 | Korpi | H04W 28/04 |
| 10,673,740 | B2* | 6/2020 | Rafique | H04L 43/0817 |
| 10,678,233 | B2* | 6/2020 | Cella | H04L 1/0002 |
| 10,742,721 | B1* | 8/2020 | Wagner | H04L 12/4641 |
| 10,747,592 | B2* | 8/2020 | Kolodzieski | G06F 9/542 |
| 10,754,720 | B2* | 8/2020 | Mahindru | G06F 11/008 |
| 11,010,233 | B1* | 5/2021 | Golden | G06N 20/00 |
| 11,051,210 | B2* | 6/2021 | Sciancalepore | H04W 28/24 |
| 11,057,274 | B1* | 7/2021 | Kumar | H04L 41/0893 |
| 11,086,760 | B2* | 8/2021 | Roskowski | G06F 11/3452 |
| 11,153,152 | B2* | 10/2021 | Siddiqi | H04L 41/22 |
| 11,163,722 | B2* | 11/2021 | Wang | G06F 16/24568 |
| 11,218,498 | B2* | 1/2022 | Hajimirsadeghi | H04L 63/1425 |
| 11,297,622 | B1* | 4/2022 | Moore | H04W 72/048 |
| 2016/0179598 | A1* | 6/2016 | Lvin | H04L 41/0636 714/48 |
| 2016/0378816 | A1* | 12/2016 | Colla | H04L 67/2861 707/690 |
| 2018/0212829 | A1* | 7/2018 | Reid | H04L 41/0883 |
| 2018/0239725 | A1* | 8/2018 | Kumar | G06F 12/0897 |
| 2019/0052548 | A1* | 2/2019 | Kojukhov | H04L 41/5038 |
| 2019/0121350 | A1* | 4/2019 | Cella | G01M 13/04 |
| 2019/0220321 | A1* | 7/2019 | Yang | G06F 9/505 |
| 2019/0243690 | A1* | 8/2019 | Hwang | H04L 41/0663 |
| 2019/0268821 | A1 | 8/2019 | Shaw et al. | |
| 2019/0319868 | A1* | 10/2019 | Svennebring | H04L 41/147 |
| 2019/0363574 | A1 | 11/2019 | Meynardi et al. | |
| 2020/0112491 | A1* | 4/2020 | Sridhar | H04L 41/5067 |
| 2020/0112907 | A1* | 4/2020 | Dao | H04M 15/83 |
| 2020/0125389 | A1* | 4/2020 | Palermo | G06F 9/5027 |
| 2020/0136920 | A1* | 4/2020 | Doshi | H04L 43/0 |
| 2020/0184278 | A1* | 6/2020 | Zadeh | G06F 16/43 |
| 2020/0195495 | A1* | 6/2020 | Parker | H04M 15/8038 |
| 2020/0228602 | A1* | 7/2020 | Spoczynski | G06F 9/5072 |
| 2020/0229038 | A1* | 7/2020 | Zhu | G06F 9/546 |
| 2020/0310394 | A1* | 10/2020 | Wouhaybi | H04L 41/0846 |
| 2021/0073065 | A1* | 3/2021 | Bhatnagar | H04L 43/0805 |
| 2021/0099976 | A1* | 4/2021 | Mueck | H04W 72/04 |
| 2021/0105178 | A1* | 4/2021 | K | H04L 43/0817 |
| 2021/0136769 | A1* | 5/2021 | Niu | H04L 5/0055 |
| 2021/0136806 | A1* | 5/2021 | Xiong | H04W 72/1289 |
| 2021/0168031 | A1* | 6/2021 | Stockert | H04L 43/0876 |
| 2021/0176769 | A1* | 6/2021 | Chou | H04W 24/02 |
| 2021/0211347 | A1* | 7/2021 | Vasseur | H04L 43/0876 |
| 2021/0243094 | A1* | 8/2021 | Holness | H04L 41/0681 |
| 2021/0263779 | A1* | 8/2021 | Haghighat | G06F 11/3419 |
| 2021/0304027 | A1* | 9/2021 | Damodaran | G06N 20/00 |
| 2021/0306245 | A1* | 9/2021 | Bannister | H04L 69/16 |
| 2021/0400757 | A1* | 12/2021 | Dhanani | H04W 24/10 |
| 2022/0006714 | A1* | 1/2022 | Wang | H04L 43/065 |
| 2022/0015150 | A1* | 1/2022 | Ye | H04L 5/0053 |
| 2022/0019512 | A1* | 1/2022 | Renie | G06F 11/364 |
| 2022/0019561 | A1* | 1/2022 | Jose | G06F 1/3206 |
| 2022/0043703 | A1* | 2/2022 | Hwang | G06F 40/40 |
| 2022/0053372 | A1* | 2/2022 | Shekhar | H04L 67/2814 |
| 2022/0060370 | A1* | 2/2022 | Gage | H04L 41/0654 |

OTHER PUBLICATIONS

J. Zhu, P. He, Z. Zheng and M. R. Lyu, "Online QoS Prediction for Runtime Service Adaptation via Adaptive Matrix Factorization," in IEEE Transactions on Parallel and Distributed Systems, vol. 28, No. 10, pp. 2911-2924, Oct. 1, 2017, doi: 10.1109/TPDS.2017.2700796. (Year: 2017).*

R. Li et al., "Intelligent 5G: When Cellular Networks Meet Artificial Intelligence," in IEEE Wireless Communications, vol. 24, No. 5, pp. 175-183, Oct. 2017, doi: 10.1109/MWC.2017.1600304WC. (Year: 2017).*

A. V. Do, J. Chen, C. Wang, Y. C. Lee, A. Y. Zomaya and B. B. Zhou, "Profiling Applications for Virtual Machine Placement in Clouds," 2011 IEEE 4th International Conference on Cloud Computing, 2011, pp. 660-667, doi: 10.1109/CLOUD.2011.75. (Year: 2011).*

E. Caron, F. Desprez and A. Muresan, "Forecasting for Grid and Cloud Computing On-Demand Resources Based on Pattern Matching," 2010 IEEE Second International Conference on Cloud Computing Technology and Science, 2010, pp. 456-463, doi: 10.1109/CloudCom.2010.65. (Year: 2010).*

R. N. Calheiros, E. Masoumi, R. Ranjan and R. Buyya, "Workload Prediction Using ARIMA Model and Its Impact on Cloud Applications' QoS," in IEEE Transactions on Cloud Computing, vol. 3, No. 4, pp. 449-458, Oct. 1-Dec. 2015, doi: 10.1109/TCC.2014.2350475. (Year: 2015).*

Bacco, M. et al., "Networking Challenges for Non-Terrestrial Networks Exploitation in 5G," 2019 IEEE 2nd 5G World Forum (5GWF), Nov. 28, 2019, 6 pgs., https://openportal.isti.cnr.it/data/2019/404819/2019_%20404819.preprint.pdf.

Moysen, J. et al., "From 4G to 5G: Self-organized Network Management Meets Machine Learning," Computer Communications, Jan. 16, 2018, vol. 129, pp. 248-268, https://arxiv.org/pdf/1707.09300.pdf.

3GPP TR 22.891, "3rd Generation Partnership Project; Technical Specification Group Services and System Aspects; Feasibility Study on New Services and Markets Technology Enablers; Stage 1", Technical Report, Sep. 2016, 95 pages.

DL4J, "Deeplearning4j Quickstart", available online at >https://web.archive.org/web/20190507074224/https://deeplearning4j.org/docs/latest/deeplearning4j-quickstart>, May 7, 2019, 9 pages.

HPE, "Intelligent Assurance Suite datasheet", Data sheet, 2022, 22 Pages.

Kirkpatrick et al., "Optimization by Simulated Annealing", vol. 220, No. 4598, May 13, 1983, pp. 671-680.

Salton et al., "Term Weighting Approaches in Automatic Text Retrieval", Nov. 1987, 23 pages.

Wikipedia, "Convolutional neural network", available online at <https://en.wikipedia.org/wiki/Convolutional_neural_network>, Jun. 2019, 35 pages.

Wikipedia, "Long Short Term Memory (LSTM)", available online at ,https://en.wikipedia.org/w/index.php?title=Long_short-term_memory&oldid=725531201>, Jun. 16, 2016, 5 pages.

Wikipedia, "Word2vec", available online at <https://en.wikipedia.org/wiki/Word2vec, Jul. 2020, 7 pages.

* cited by examiner

SYSTEMS AND METHODS FOR PREDICTIVE ASSURANCE

DESCRIPTION OF RELATED ART

Service assurance can refer to the application of policies and processes by a service provider (SP), such as, for example, a communications SP, to ensure that services offered over a communications network meets some predefined service quality for a positive subscriber experience.

Service fulfillment (also known as provisioning) can refer to various activities associated with assembling and making services available to subscribers from a SP. Oftentimes, these activities make up an operational infrastructure whose efficiency relies on the ability of a SP to match the supply of services with demand while maintaining service quality and reliability.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
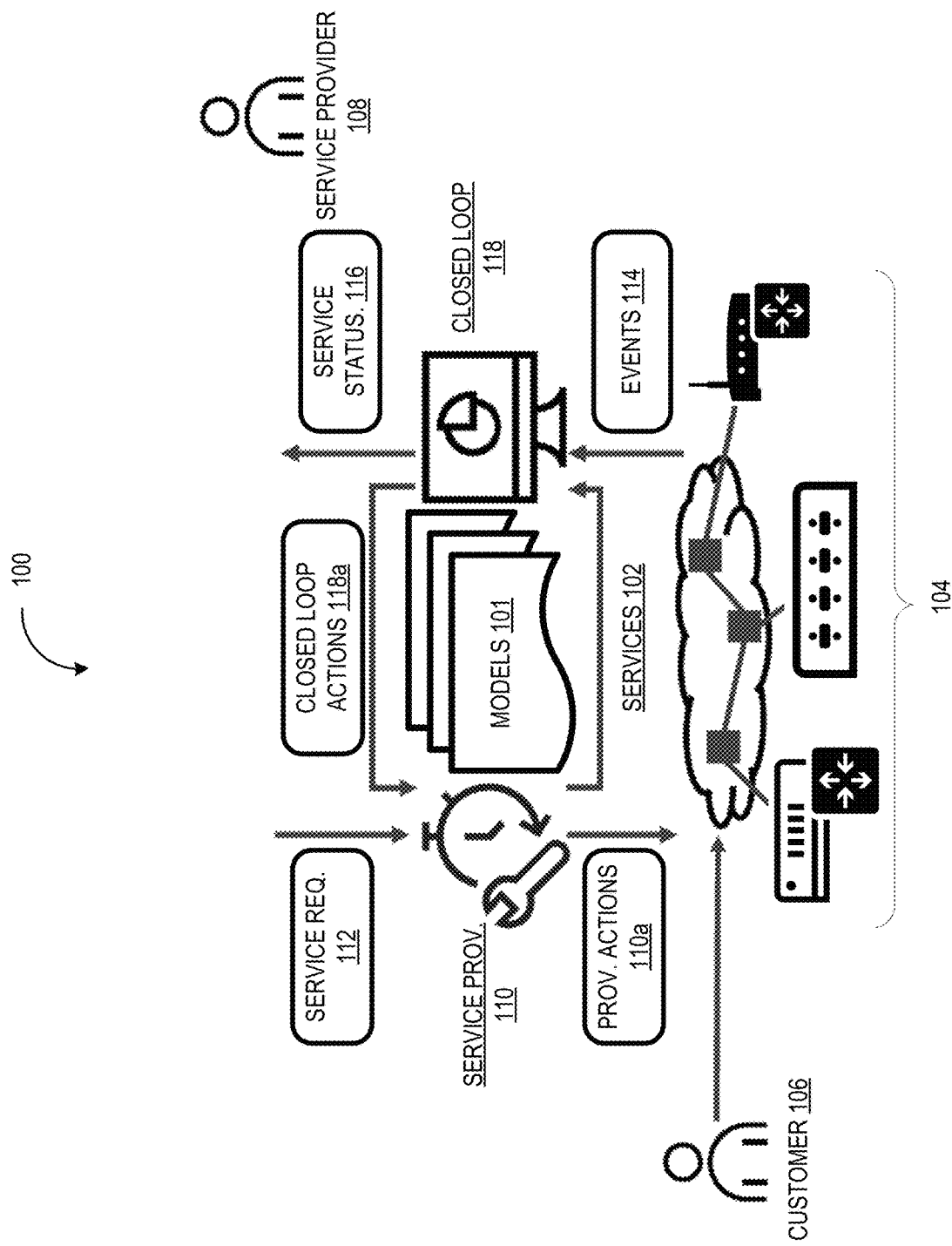
FIG. 1 illustrates an example service provider workflow in accordance with one embodiment of the disclosed technology.

The figures are not exhaustive and do not limit the present disclosure to the precise form disclosed.

DETAILED DESCRIPTION

As noted above, operation of a Service Provider (SP) can involve both service fulfillment and service assurance. Part of the service assurance aspect of a SP's operation can involve addressing failures, such as network function (NF) failures, that can lead to service outages and/or service degradations in carrier scale telecommunication networks. Such failures result in unacceptable business outcomes for a SP. Therefore, SPs have increasingly begun looking for proactive approaches to addressing NF failures. The urgency for proactive carrier-grade solutions is further heightened due to the deployment of the latest network technologies, e.g., 5G, which have resulted in increased complexities involved in troubleshooting and remediating network issues (although various embodiments disclosed herein are not limited to any particular network or system or network technology).

Network function virtualization (NFV) is an emerging design approach for migrating physical, proprietary, hardware boxes offering network services to software running in virtual machines or containers on industry standard physical servers, particularly in the telecommunications industry. The classical approach to network architecture is based upon fragmented, purpose-built hardware for implementing NFs—also known as physical NFs (e.g., firewalls, deep packet inspectors, network address translators, routers, switches, radio base station transceivers) which require physical installation at every site where they are needed. In contrast, NFV aims to consolidate many network equipment types onto, for example, standardized high volume servers, switches, and storage through the implementation of virtual network functions (VNFs) in software which can run on a range of standard hardware. Furthermore, NFV aims to transform network operations because the VNFs can be dynamically moved to, or instantiated in, various locations in the network as required without the need for installation of new hardware. Furthermore, multiple physical NFs and VNFs can be configured together to form a "service-chain" and packets steered through each network function in the chain in turn.

With the advent of containerization and CNFs (Container Network Functions), dynamicity from edge to core in, e.g., 5G, has become possible, implying a dynamic and software/data-driven approach for network operations may be adopted. As will be described herein, a transition to more proactive management of NFs can be effectuated through the exploitation of large amounts of data generated by these networks.

Accordingly, various embodiments of the present disclosure are directed to systems and methods for predicting NF failures, and notifying a SP in advance of NF failures actually occurring. In particular, a SP's operations' analysts can identify situations (that involve NFs) which lead to service outages, and which can be predicted in advance of the service outages actually occurring. Then, the identified situations can be operationalized in a real-time production engine so that early warning signals of a potential service outage (or degradation) can be provided. In this way, a SP's operations' teams and/or systems (e.g., assurance systems) can take proactive remediation steps or assurance actions to avert such service outages, failures, or other associated problems.

Various embodiments can be based, e.g., on the following heuristic observations. NFs, whether physical, virtualized or containerized, may generate, e.g., tens of thousands of events or log messages in the time frame preceding and leading up to a service degradation or outage situation. The number of distinct types of events or log messages from a system/network are finite in number and most often do not exceed a couple of hundred message types making learning/analyzing such events/logs feasible, although various embodiments are not necessarily limited by any number of distinct message types. Further still, most failure scenarios involving NFs demonstrate a distinctive histogram of counts and sequence of message types. The histogram of message type counts tend to exhibit a good fit to an exponential or power law function. Moreover, an associated, fitted, continuous probability density function (PDF) should make for a good fit to, for example, the Exponential, Gamma, Weibull or Pareto distribution functions, or other mathematical criterion that positively qualifies a failure scenario as a good candidate for predicting when to send an early warning signal.

For example, in a 5G context, Radio Units (RUs) in a 5G Radio Access Network (RAN) can become completely non-operational or partially degraded as a consequence of any one or more of the following: radio transmission and reception problems; environmental issues like high temperatures in the operating environment; poor power conditions and associated rectifier malfunctions; failing or weakening batteries; degraded/slowly degrading wireless backhaul IP connections; poor weather conditions leading to problems in line-of-sight microwave links; etc. Such issues/scenarios are indicative of events generated automatically by a 5G network, and can be used as input to the disclosed systems/methods which can learn how to predict their occurrence. It should be understood that 2G, 3G, and 4G networks can experience the same/similar issues, and thus, various embodiments can be applied in those contexts as well. Similarly, data units (DUs) as well as control units (CUs) can suffer from similar problems leading to operational degradation and/or failures. It should be further understood that various embodiments are applicable to wireline networks and other types of automatically generated events.

The systems and methods disclosed herein for predicting service degradation and outages based on NF failures and for generating early warnings involve a "discovery" phase, an "operationalization" phase, and a "production run-time" phase.

In the discovery phase, statistical techniques quantitatively qualify and identify an NF failure scenario that can be a good indicator for future failure predictions. Time series event and/or log data is received, type-categorized, and labeled. NF failure scenario candidates are identified. Scoring is performed on the NF failure scenario candidates, and ultimately, the time between occurrence of events or messages having the highest scores is computed, and used to estimate time frames for early warning for each NF failure scenario situation/scenario. The data-fitting process can be accomplished using, e.g., least squares regression (LSR), Simulated Annealing, and Chi-squared/Kolmogorov-Smirnov tests on a big data computational framework (Spark or Flink or other framework supporting stateful computations over high volume and throughput data streams).

In the operationalization phase, the identified predictive NF failure scenarios are deployed as production run-time machines. Machine learning can refer to methods that, through the use of algorithms, are able to automatically turn data sets into information models. In turn, those models are capable of making predictions based on patterns or inferences gleaned from other data. There has been a push to implement machine learning in enterprise environments, e.g., businesses, so that these entities may leverage machine learning to provide better services and products to their customers, become more efficient in their operations, etc. Implementing machine learning into the enterprise context, also referred to as operationalization, can involve the deployment (and management) of models, i.e., putting models into production.

In the production run-time phase, the production run-time machines will analyze a real-time incoming stream of messages from the NFs, and generate early warning signals with an associated probability and estimated time frame in which the degradation or outage scenario will occur. The design of the production run-time inference machine involves three neural networks (NNs), namely a Word-To-Vector NN, a Convolutional NN (CNN), and a Long Short Term Memory (LSTM) NN running back-to-back. It should be understood that other AI/machine learning methods/mechanisms can be leveraged in accordance with other embodiments.

It should be noted that although various embodiments are described in the context of NF instances and NF failures, embodiments are not necessarily limited to NFs. That is, any system or network application or aspect(s) that can be used as a basis for predicting some failure or outage can be leveraged. Moreover, predicted events need not be limited to system failures. That is, a system can be monitored with respect to messages, events, or other status indicators of a particular aspect(s) of the system that a SP (or other entity) wishes to track and predict.

FIG. 1 illustrates an example Service Provider (SP) workflow 100 that is representative of actions, operations, events, etc. that may occur in the context of service fulfillment and service assurance. The term "service" as utilized herein, can refer to the orchestration of changes in a (often complex) system of interactive services, networks, and systems for the creation of communication services or products. For example, a service can be an entity, class, node, vertex, etc. Accordingly, in a traditional sense for example, a service can be some collection of actions effectuated through one or more computational/memory resources (physical and/or virtual) that produce a desired result, but underlying that collection of actions are parameters, relationships, and/or potential actions impacting or involving one or more of the actions making up the collection of actions.

As illustrated in FIG. 1, services 102, e.g., a 5G breakout service, may involve certain physical and/or virtual resources implemented on infrastructure 104, such as servers, wireless local area network (WLAN) devices, e.g., access points, routers, etc. Following the 5G breakout service example, it should be understood that resources, like services, described above, can be, but are not limited to components, aspects, objects, applications, or other elements that provide or act as a prerequisite to such element, e.g., another resource or service. For example, infrastructure 104 can include connections to/from one or more physical and/or virtual infrastructure, which can also be considered to be resources. In some embodiments, a resource can refer to a service that needs to be in an active state before another service can begin to be designed or utilized to effectuate that other service. Such services 102 can be provided to a customer 106 by a service provider 108 upon being provisioned through a service provisioning mechanism/process 110 and corresponding provisioning actions 110a in response to service requests 112 from, e.g., a customer relation management (CRM) layer. In particular, services may be defined (e.g., a service's appearance and/or how a service is built) in a catalog that may also reflect relationships between services (parent-child and/or linked relationships, inheritance relationships, etc.). It should be understood that services and services' structure can be maintained in a service inventory. Service requests 112 may include service data collection, service order validation, service order orchestration, service order tracking and/or management, and the like. Based on the building blocks that define a service, the service resources may be activated. Accordingly, the services 102 may be specified as models 101.

As alluded to above, and following the example 5G breakout service, a 5G break-out service may be deployed on multiple premises of retail stores using a combination of hardware (e.g., servers, antennas, cables, WAN terminations), and Virtual Network Functions (VNFs). Such services may be used for intercepting various types of mobile traffic generated by customers and employees within the retail stores, and/or directing specific traffic to custom applications hosted by the enterprise or customers of the enterprise. Such services may also be part of an end-to-end service, providing functionalities such as data-reduction, analytics, remote monitoring and location-aware services used by the customers and employees. Another service example may be a classical cloud-like service offering, but combined with network service offerings, such as different security zones (customer, employee, legal, etc.) combined with firewalling, routing configurations, and extensions to end-customer premises.

Any issues or problems that exist or may arise regarding any service(s) may be identified through the collection of events 114 from the physical and/or virtual resources implemented on infrastructure 104. A service impact analysis may be performed to determine a service's status 116, and service provider 108 may be informed of any such issues/problems. Resolution of such service issues/problems can be automated via closed loop remediation processing 118 that are realized with closed loop remediation actions 118a, and healing or remediation processes may be triggered.

Figure 2:
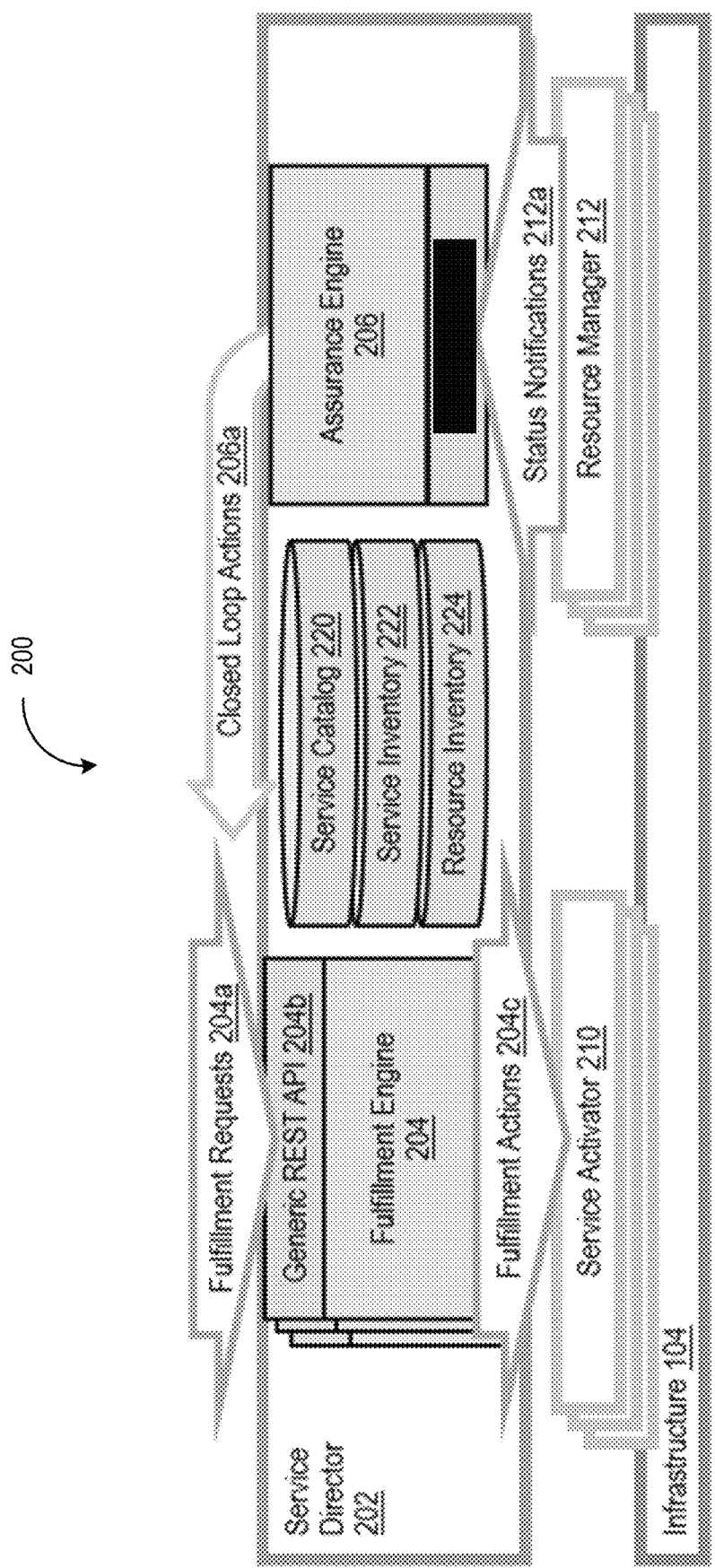
FIG. 2 illustrates an example service provider system architecture in accordance with one embodiment of the disclosed technology.

FIG. 2 is a schematic representation of a SP system architecture 200 that includes service fulfillment and service assurance functionality. A service director 202 may refer to a model-based orchestration engine for managed hybrid services. Service director 202 may, in some embodiments, comprise a service fulfillment engine 204 and a service assurance engine 206. In accordance with various embodiments, a closed loop framework or mechanism for addressing both service fulfillment and assurance can be realized, although a closed loop framework is not necessary. That is, and as alluded to above, service-level issues, problems, etc. can be addressed automatically by service fulfillment actions. In other words, the same mechanism (service fulfillment engine 204) used to provision/fulfill service requests can be used to solve service incidents identified by, and as instructed by service assurance engine 206. Moreover, as can be appreciated from FIG. 2, that a single service inventory 222 is implemented (as well as a single service catalog 220 and a single resource inventory 224) between service fulfillment engine 204 and service assurance engine 206.

For example, fulfillment (service) requests 204a may be received by service director 202 via a RESTFUL application programming interface (API) 204b. Service fulfillment engine 204 may perform various fulfillment (service provisioning) actions. In particular, service fulfillment engine 204 may define services through mathematical models and store these service definitions in a service catalog 220, which may be a database, database partition, or other data repository. Moreover, service fulfillment engine 204 may orchestrate service instantiation based on defined rules and policies. As a result of such service instantiation by service fulfillment engine 204, a service inventory 222 can be automatically populated. It should be understood that service inventory 222, like service catalog 220, may be a database, database partition, or other data repository. Service inventory 222 can contain versions products, services, and/or resources as defined in the service catalog 220, while a resource inventory 224 may contain information regarding resources (e.g., elements of infrastructure 104) that can be leveraged to provide services. A service activator 210 may implement or carry out execution of the fulfillment actions 204c (i.e., executing commands regarding service provisioning) on the requisite resources comprising infrastructure 104.

Once a service(s) is instantiated and operational for a SP, from the service assurance perspective, a resource manager 212 may perform, e.g., resource monitoring on the physically and/or virtually-implemented resources, and status notifications 212a (e.g., events) can be collected and distributed to an enterprise service bus, event bus, or similar integration system. In this embodiment, an event bus 208 may be used, such as Apache Kafka, an open-source stream-processing software platform, generally leveraged for handling real-time data feeds. Other event buses include, but are not limited to, Amazon Kinesis, Google Pub/Subm and Microsoft Event Hubs. Moreover, as will be described in greater detail below, this resource monitoring by resource manager 212 may provide the requisite information or data, e.g., time series event and/or log data from which NF failure scenario candidates may be identified, type-categorized and labeled. In the discovery phase, statistical techniques quantitatively qualify and identify an NF failure scenario that can be a good indicator for future failure predictions. Time series event and/or log data is received, type-categorized, and labeled. NF failure scenario candidates are identified. Scoring is performed on the NF failure scenario candidates, and the time between occurrence of events or messages having the highest scores is computed and used to estimate time frames for early warning for each NF failure scenario situation/scenario. Moreover, upon operationalization of the aforementioned production run-time models, resource manager 212 may begin to receive predictive notifications, e.g., early warning signals of impending system failure, degradation, etc.

Resource inventory 224 may comprise a data repository in which records including physical, logical, and/or virtual resources that are available to be used to implement a particular service(s). For example, resource inventory 224 may maintain information regarding infrastructure elements on which virtualized resources may be instantiated to realize a requested service that service fulfillment engine 204 seeks to fulfill/provision.

While logical and virtual resources are discussed, it is to be understood that these will ultimately, e.g., at a low level of implementation detail, be implemented using physical computing, storage or network, i.e. hardware, resources. For example, a network function virtualization infrastructure may comprise virtual computing (e.g., processor), virtual storage (e.g., hard disk) and virtual network (e.g., virtual network interface controllers) resources implemented on a virtualization layer (e.g., implemented by one or more hypervisors or virtual machine monitors). The virtualization layer may then operate on hardware resources such as processor devices, storage devices and physical network devices, for example as provided by one or more server computer devices.

The resource manager 212, together with the resources defined in resource inventory 224, provide entity-action building blocks based on a physical and/or virtual infrastructure 104 that may be combined in the form of a descriptor to enable the provisioning of a service. Service fulfillment engine 204, as alluded to above, performs the requisite orchestration to provide the desired network function virtualization, while resource manager 212 determines how to orchestrate the resources for supporting the desired network function virtualization.

In FIG. 2, an event bus 208 may be used for messaging, storage, and processing of any events, i.e., occurrences in the SP's system and/or the status notifications arising from the resource monitoring of the services provisioned by the service fulfillment side of service director 202 as a result of such occurrences, which can include lost communications, lost service, resource failures, service quality level falling below a threshold, etc. Service assurance engine 206, upon receiving such status notifications regarding service and/or resource issues can determine how the service and/or resource can be healed by addressing the issues (described in greater detail below). Again, and as alluded to above, upon operationalization of production run-time models disclosed herein, system issues can be predicted and notifications can be generated ahead of such system issues actually occurring. Service assurance engine 206 may send closed loop actions 206a (described above) to the fulfillment engine 204, effectuating a closed loop, so that fulfillment engine 204 can carry out the necessary actions to achieve the requisite service assurance.

Figure 3:
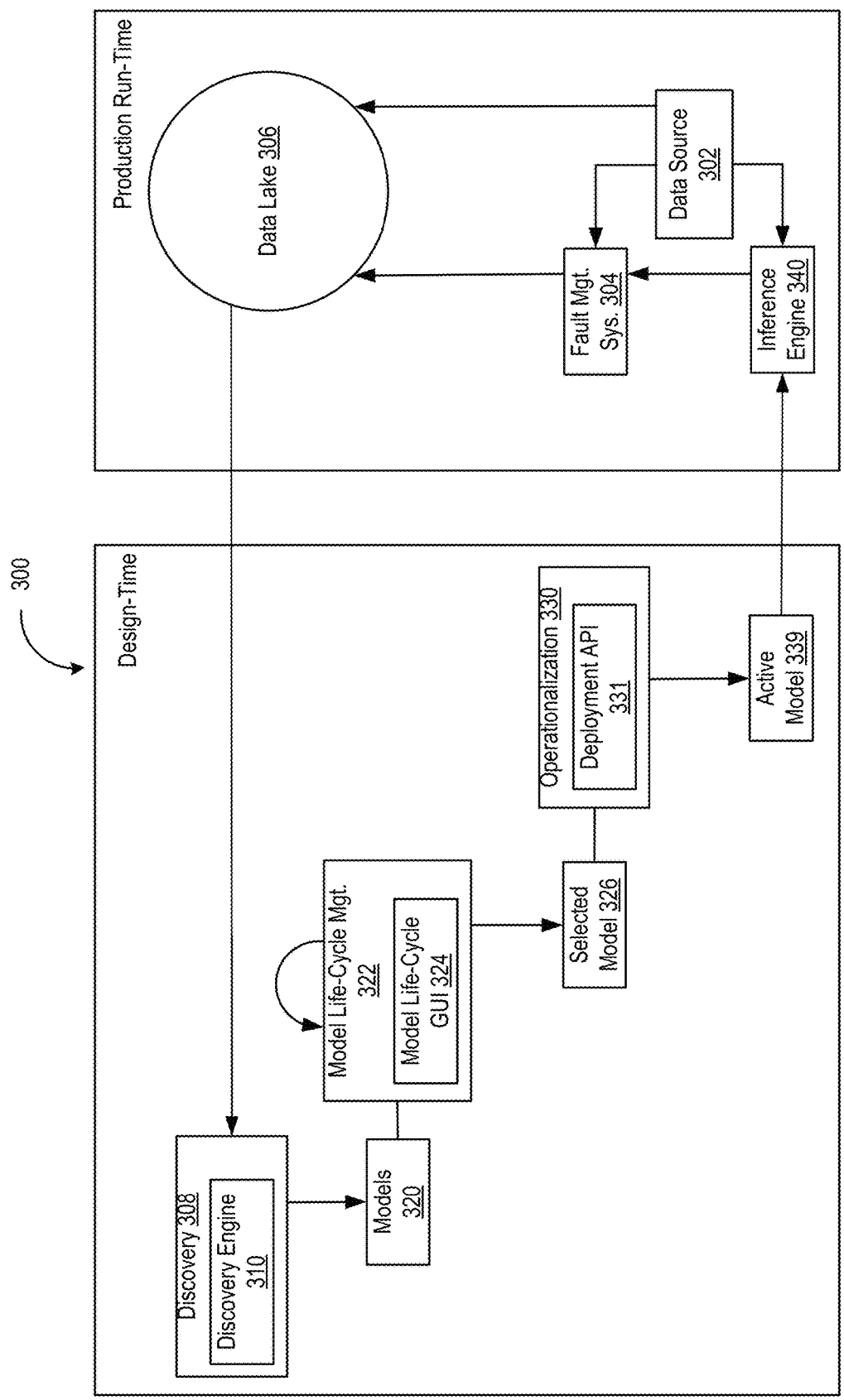
FIG. 3 illustrates an example prediction system in accordance with one embodiment of the disclosed technology.

As alluded to above, NF failure prediction and service degradation/outage warnings can be accomplished over the course of a discovery phase, an operationalization phase, and a production run-time phase. FIG. 3 is a schematic representation of a system architecture 300 embodying these three phases. As illustrated in FIG. 3, a data source 302 (which may represent one or more systems, system components, NFs, etc. from which events, messages, log data can be received) contribute raw event data to data lake 306. Data lake 306 can be a store for data, e.g. enterprise data, including, raw copies of source system data, and transformed data used for reporting visualization, analytics, machine learning, etc. Since both the volume and throughput of data, i.e. the messages or events, are large, tools and platforms that are capable of handling this volume and throughput may be used. Big data technologies are specifically engineered to address these needs and allow computational results to be generated in finite time, within the available computational resources, and data lake 306, in this context, may be used to persist or host incoming data, large in volume and high in throughput, which is subsequently processed by the systems methods described herein. Data lake 306 may aggregate information from one or more portions, aspects, components, etc. of a SP system (e.g., FIGS. 1 and 2). Alarm/incident-related information can also be received by data lake 306 from a fault management system 304. Assurance engine 206 (FIG. 2) may be thought of as an embodiment of such fault management system 304. The alarm/incident-related information along with the raw event data, can be automatically analyzed, e.g., offline, during the discovery phase 308. A discovery engine 310 may implement the discovery phase, where statistical techniques are used to quantitatively qualify, and identify a NF failure scenario which lends itself to the possibility of predicting a service failure at a future point in time. Once NF failure scenario candidates have been identified, symptoms associated with the NF failure scenario candidates are scored, and early warning signal time frames can be estimated. In other words, discovery comprises mathematically framing a problem to be solved. This leads to the development of models 320 that can be trained.

Upon selection of a model (selected model 326), the operationalization phase 330 can commence. The operationalization phase can be effectuated by operationalization functions that serve to deploy production run-time machines or models, e.g., active model 339, reflecting the intelligence learned by discovery engine 310 using a deployment API 331. For example, some client or user which seeks a prediction (inference request) may input data to the API server (which may be using the Representational state transfer (REST) architecture or a remote procedure call (RPC) client). In return, the API server may output a prediction based on the active model 339.

Once such production run-time machines or models are operationalized, they can operate, collectively, as an inference engine 340 that in real-time, may analyze incoming message streams according to/using the production run-time machines/models to predict upcoming or future service degradation and/or outages. Upon predicting such future service degradation/outages, inference engine 340 may output early warning signals in advance of the predicted service degradation/outages.

Moreover, the production run-time machines/models (e.g., active model 339) may, over time, lose prediction accuracy. Accordingly, in some embodiments, inference engine 340 may access fault management system 304 (described above) to compare generated predictions with the historical information regarding past service degradation, outages, and/or other service issues. If the accuracy of the generated predictions falls below some threshold, the run-time production machines/models may be re-calibrated, e.g., by retraining/relearning via repetition of the discovery phase. That is, with any machine learning model, changes in precision and accuracy of the prediction or inference can occur over time. When the precision and accuracy of the model do not relate well, within a margin of pre-defined acceptable errors, that model may require recalibration, or go through the discovery and operationalization phases again. This enables a new model to be generated that reflects reality better, and produces prediction, or inferences, that are more meaningful and useful. This can be referred to as the model life-cycle management 322. A model life-cycle graphical user interface (GUI) 324 may be provided to allow a user to perform this recalibration, initiate re-discovery and/or re-operationalization. It should be noted that similar to the closed-loop aspect described above, such an implementation of various embodiments also results in a closed-loop implementation between the discovery/design and production run-time phases.

Figure 4:
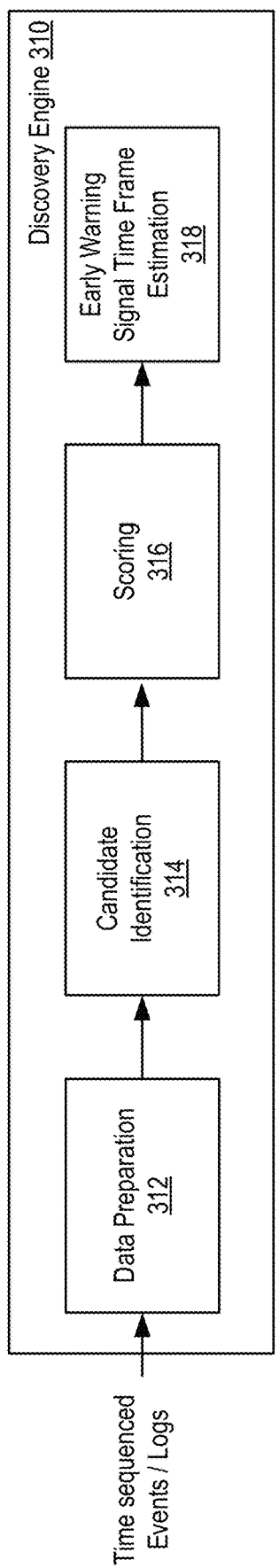
FIG. 4 is a schematic representation of discovery phase components of the prediction system of FIG. 3.

FIG. 4. illustrates operations that may be performed during the discovery phase (implemented by discovery engine 310), broadly characterized as data preparation 312, candidate identification 314, scoring 316 (i.e., scoring or weighting of individual events or message types, aggregated scoring, and early warning signal time frame estimation 318 (which can include identifying similar instances of predictive situations).

Data preparation 312 can involve clustering symptom information available in the collected datasets (messages comprising the time-sequenced collection of events/logs) from the underlying NF instances, into equivalence classes, where a cluster or class of events represents the same symptomatic condition from different instances of a NF. Some non-limiting examples include log messages generated by switches or routers (e.g., "Service Unstable," "MPLS path down on LSP," "Remote MEP CCM Failure" messages). Other non-limiting examples include event messages generated by RAN equipment (e.g., "Remote_Node-_Transmission_Error," "Clock_Synchronisation_Problem," LAN_Error/Communication_Error," messages). It should be understood that embodiments disclosed herein are not limited to particular messages/types of messages.

In other words, the events or logs that are collected can be classified by NF type and instance, and they can be labeled accordingly. These events can be thought of as symptoms that may eventually lead to/result in some NF failure scenario such as the aforementioned system degradation and/or system outages. Labeling elements of a dataset (in this case individual messages regarding events involving particular NF types and NF instances) can be accomplished through a combination of clustering techniques. Here, the term clustering technique is to be understood as used in the context of unsupervised machine learning.

Depending on the nature of the dimensions used to cluster the given data-set into equivalence classes, a variety of clustering approaches can be used as follows. In an example, for simple string, token or enumeration fields, standard K-Means clustering can be performed after applying a sequence of data transformations like string indexing, one-hot encoding, and vector assembly. The HyperLogLog algorithm can be used to estimate the number of distinct message clusters used as an input to the K-Means clustering algorithm. In another embodiment, for free-text fields with low to medium complexity, Locality Sensitive Hashing (LSH) can be performed when the message is more unstructured in nature. In another embodiment, for free-text fields with medium to high complexity, Word-to-Vector and Document-to-Vector, with Term Frequency-Inverse Document Frequency (TF-IDF), followed by K-Means clustering. In this way, a corpus of data (collected events/logs indicative of the state of a NF) can be established from which candidates reflecting an NF failure scenario that possibly may predict a future system failure can be identified.

It should be noted that various embodiments are not restricted with respect to any NFs, network domains, or technologies to which they can be applied so long as a data-source can provide a time sequenced collection of events or logs, and the collection of messages obey some mathematical criterion. It should be further noted that typically, alarms or fault conditions are not a good data source for identification of scenarios that can be averted or remediated through generation of an early warning signal. Any summarization, consolidation or aggregation operation applied to a given data set generated by a NF results in information loss. Essentially, the latent information in the temporal dimension gets filtered or compressed, and thus the resultant information, namely alarms, are not of any use for a detailed analysis of the temporal dimension.

Candidate identification operations 314 may involve selecting those potential NF failure scenario candidates that will be accurate predictors. It should be noted that degrees of accuracy can vary depending on the system/network at issue, the needs of a SP, the aspect(s) the SP wishes to predict, etc. Thus, the term "accurate" is not limiting, and different levels of accuracy may be sufficient to deem a particular candidate an accurate predictor. Generally, good NF failure scenarios or events candidates for such predictive analyses are ones with an extremely large (relative to other NF failure scenarios/events) number of message counts for a given time horizon. For example, those selected as potential NF failure scenario candidates (events or messages) for analysis may be associated with NF instances that exhibit event counts typically in the 98 or 99-percentile range and above. It should be understood that a NF failure scenario could potentially lead to some larger or more global system issue/failure scenario. However, there are no restrictions regarding the applicability of various embodiments regarding failure or issue prediction to any particular context. Thus, various embodiments can be used to predict a NF failure, a system failure, a system component failure, etc. What may be predicted is present in historical data of a system, and a system failure(s) can be predicted, for example, upon receipt of information for the overall system. It should be understood that although some embodiments are premised on identifying NF failure scenarios/event candidates having a large message count characteristic, other embodiments may look for/depend on other NF failure scenario/event candidate characteristics currently known (or known in the future).

It should be noted that the above-noted characteristic of having a spike or extremely large number of message counts for a given time horizon can manifest in a variety of contexts. Using one of the aforementioned clustering mechanisms to identify a probability distribution of messages or events of the above-noted types, a function mapping each distinct message/event type to a score or random variable value (based on the probability distribution) can be created. With the function mapping the message type to a score, the associated stochastic process from the messages generated by the network function can be computed. Because a stochastic process governed by a specific probability distribution has been identified, it can be assumed that there will be time slots with increasing aggregated scores. The time difference between the highest and second highest aggregate scores, per time window, can provide an estimate of the advance time in which an early warning signal can be generated.

Once preliminary NF failure scenario candidates have been selected, the preliminary NF failure scenario candidates are further qualified as being capable of accurately predicting a future system failure and capable of being used as a basis for generating an early warning signal. This qualification process can include performing a Least Squares Regression (LSR) operation to fit an exponential or power law function to a histogram or distribution of event counts. A simulated annealing algorithm can be applied to find a global minimum of the sum of least squares. Subsequently, a Chi-squared test can be applied to confirm if the fitted exponential or power law function is a good fit.

Similarly, LSR, utilizing the simulated annealing algorithm, can be used to find the best fitting probability density function (PDF) for the probability mass function (PMF) obtained from the histogram of event counts. A Kolmogorov-Smirnov test can then be used to confirm that the best fitting PDF originates from one of the following distributions: Exponential, Gamma, Weibull or Pareto. NF failure scenario candidates not passing the above tests are rejected as suitable candidates for making an early warning prediction. In other words, a histogram of event counts and an associated PDF exhibiting a specific behavior can be validated using the above-described data fitting procedure.

It should be understood that a characteristic of most, if not all systems or networks is that prior to experiencing some sort of a failure or going down, systems or networks will "talk" more. That is, symptoms indicative of a pending failure will begin to appear, and systems and networks will start to issue messages (seen as events or seen in logs) regarding these events that can be symptoms of, e.g., an NF failure scenario. Typically, the closer systems and networks come to failing, the number of messages/events will increase exponentially. The discovery phase disclosed herein and effectuated by the discovery engine 310 involves identifying NF failure scenarios that are good harbingers of a system failure. Once identified, these NF failure scenarios can be used to train a model(s) that will be able to analyze real-time NF failure scenarios and determine when a system failure is pending.

Scoring operations 316 may be performed to assign a score or weight to each distinct message or event type (or symptom) reflecting an NF failure scenario. It should be understood that the identified events occur over some time horizon (recalling the collected events/logs are time sequenced). A score can be assigned to each message or event, and the time horizon can be split up into time slices. It should be noted that a time horizon can be determined through learning based on previous NF failure scenarios. That is, time horizon can be an output from characterizing an NF failure scenario. In some embodiments, a large-enough time horizon can be specified to capture the requisite information/data needed, and from there, an appropriate time horizon to consider can be learned. For example, information theoretic techniques can be used during the discovery phase to determine the appropriate size/duration of a time slice for a given time horizon, and the associated dataset of messages, logs, and/or events.

The scores of each of the events occurring in each time slice can be aggregated to create an aggregate score for that time slice. It should be noted that in some embodiments, the aggregate scores can be normalized by further applying standard statistical measures, such as calculating a mean value or median. This can be done to account for situations wherein time slices may encompass different numbers of events, and the number of events is not necessarily meaningful. However, despite this normalization, as a system or network comes closer to some system/network failure event, the aggregate score associated will nevertheless begin to increase. The highest aggregate score will typically be observed upon occurrence or arrival of the system/network failure. It should be understood that the mathematical modeling (the manner in which scores are assigned to different messages) of a problem ensures that increasing values of the scores suggests an impending problem or failure scenario. For example, messages that are generated with high frequency tend to have lower scores. Over time, a failing NF will issue more messages and of greater severity, but with a lower frequency. Such messages, occurring later in the time horizon, with lower frequency, indicating a higher severity, are assigned a higher weight or score. A time difference between a time when the highest aggregate score is observed and a time when the second highest aggregate score is observed can be considered the time period, the beginning of which can be the basis for sending an early warning signal. During the discovery phase, (in design-time), an optimal advance notification time can be learned from the collected data relating to multiple instances of a NF failure scenario to be used during prediction/inference (in run-time).

In operation, values are assigned to a variable, which in some examples may be a random variable. Each variable may represent a distinct message type, and the values can be assigned based on a ranking of the histogram of event counts corresponding to the different the message types. This random variable can be referred to as the "score" assigned to each distinct message type. It should be noted that often, the event counts of several distinct message types, especially for messages occurring late in a sequence of events, might be the same for a given NF failure scenario. Given that probability space, based on a measure theoretic definition of probability, is a Borel sigma algebra, multiple sigma algebras can have the same probability. Accordingly, if the same value of the random variable is assigned to multiple message types from different sigma algebras, then the associated discrete time series of scores will not allow one to identify and predict a failure scenario. To overcome this prediction capability limitation, the additional dimension of time is introduced and exploited such that message or event types occurring later in the time horizon are assigned higher weights or scores. This can be overcome by determining the chronological order in which these message types, that is, message types with the same count, or having the same probability but belonging to different sigma algebras, occur, and manually assigning a lower score or weight to the message type occurring earlier. This is done so that messages occurring later in a sequence are considered to be more important and more service-impacting. Again, messages that occur later tend to be more indicative of an impending failure.

In another embodiment, the fitted PDF can be inverted, and the variate can be used for a specific probability value to assign a weight or score to each message type. It should be noted that the analytical approach is robust and insensitive to the specific technique used to assign the scores or weights to each message type. Accordingly, other embodiments may utilize other techniques or mechanisms to score NF failure scenario candidates.

For example, to simplify, i.e., reduce the number of independent candidates to be analyzed, more sophisticated scoring mechanisms could be applied across a wide set of related NFs. In some examples, TF-IDF numerical statistics can be used. Here, a document is considered to be the set of messages occurring in each time slice. Time slices of messages taken together may constitute the corpus of "message" documents. Each distinct message type may be assigned a score reflecting the importance of the message type in relation to the entire collection of documents in the corpus, or time slices that the time horizon has been split up into. When there are multiple instances of the same class of NF failure scenarios, more general scoring schemes can be applied, e.g., TF-IG (Information Gain), TF-GR (Gain Ratio), TF-CC (Correlation Coefficient), TF-MI (Mutual Information), TF-OR (Odds Ratio) or TF-CHI (Chi-squared).

The next step is to compute an aggregated score, where the time horizon over which a sampling of events or messages has been collected, corresponding to a NF failure scenario, into time slices. For each time slice we compute a representative aggregated score derived from the scores or weights for the messages occurring in each time slice.

As alluded to above, there are several options for determining the representative score based on standard statistics like the cumulative aggregate score, mean, median, weighted average or dispersion weighted average score. Aggregate scores for each time slice based on information theoretic measures can be used as well. In some embodiments, a plurality of representative or normalized scores can be calculated using some or more of the aforementioned options, and the aggregate scoring mechanism that more clearly amplifies the differences between the two highest aggregated scores in the selected data-set can be selected. The difference between the highest and second highest time slice aggregate scores can be used to provide an estimate of time preceding a predicted NF failure event during or prior to which, an early warning signal can be generated and transmitted. Typically, the time instant of the second highest time slice score or the nearest, next highest time slice score to the highest score can be used to generate the early warning signal.

Figure 5:
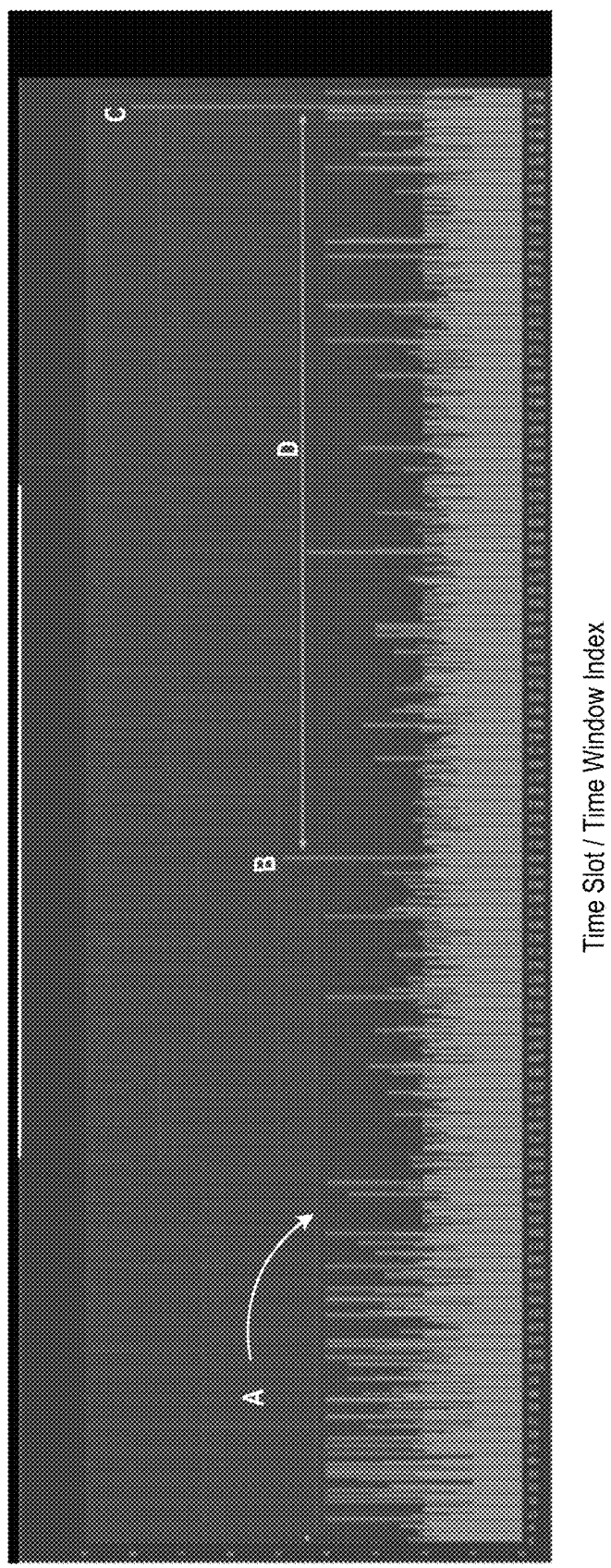
FIG. 5 is a graphical representation of an example early warning signal time determination in accordance with one embodiment of the disclosed technology.

Referring now to FIG. 5, an example of the aggregate scoring and time difference calculation is described. FIG. 5 illustrates an example histogram of scores for a time slice corresponding to events over some period of time that can reflect an incoming real-time stream of messages A that are received by discovery engine 310. As illustrated, the example histogram may be representative of the aggregate score (Y-axis) as a function of time slot/time window (X-axis), The amplitudes at times B and C reflect the two highest aggregated scores in a validated NF failure scenario dataset. Time C, where the highest aggregate score is observed, reflects the occurrence of a system or network failure, e.g., system degradation necessitating remediation, system outage, etc. The second highest aggregate score observed at time B can be used as a time frame estimate prior to which (or during which), an early warning signal should be sent. Depending on how risk averse a system/network may be, the time frame estimation may be considered in its entirety, i.e., this particular scoring iteration may associate the time of the second highest aggregate score to be the time (or close to the time) at which an early warning signal should be sent. However, in another embodiment, it may be determined that some period between the time of the second highest aggregate score and the time of the highest aggregate score may be sufficient to second an early warning signal. In still other embodiments, a time prior to the second highest aggregate score may be deemed an appropriate time to send an early warning signal.

Early warning signal time frame estimation 318 can involve generating or computing a high dimensional vector representation of the symptoms that represent a qualifying NF failure prediction scenario. This can be accomplished using the Word-To-Vector algorithm. Using the vector representations of the symptom events, and the time sliced collections of the events, TF-IDF weighted document vectors for each time slice can be calculated. The Approximate Nearest Neighbor algorithm can be used to find or group all similar NF failure prediction situation instances. In this way, early warning signal time frames can be estimated for every NF failure scenario that was identified and validated as being predictable. It should be noted that such estimates can be averaged (as some variance of estimated time until a failure may differ across different instances even of the same NF failure scenario. For example, some measure of a central tendency (mean, median, mode) can be computed. Because the number of datasets available for training may not be large, in some embodiments, it can be more advantageous to select a median value or perform a simple bootstrap estimation of the central tendency measures.

Figure 6:
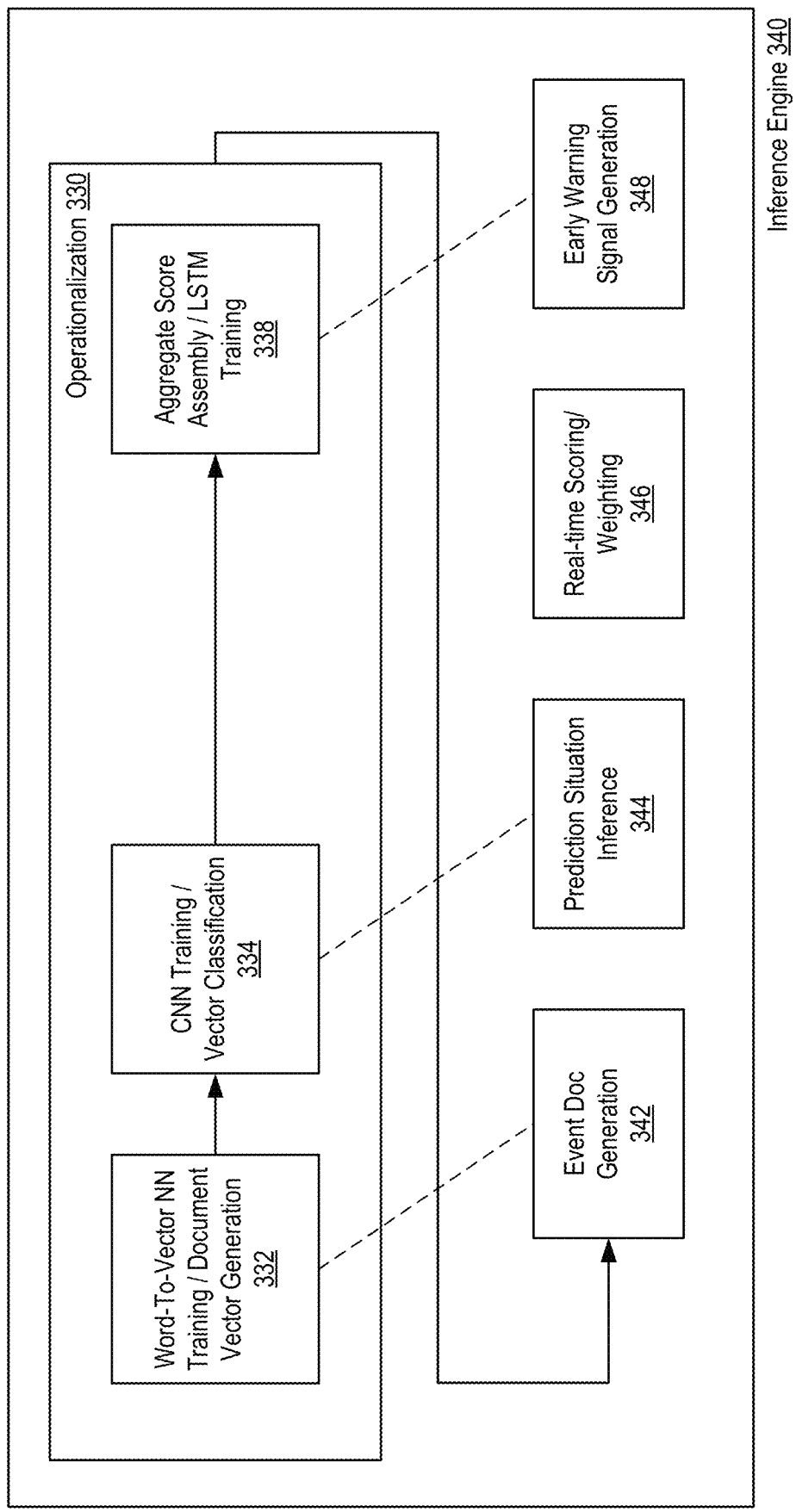
FIG. 6 is a schematic representation of operationalization and production run-time phase components of the prediction system of FIG. 3.

FIG. 6 illustrates example operations making up the operationalization phase 330, and example operations performed by the inference machine 340 (i.e., the production run-time machines). As noted above, the operationalization phase has been designed to allow the discovered NF failure prediction scenarios to be deployed as production run-time machines that will analyze the real-time incoming stream of messages from NFs, and generate early warning signals with an associated probability and estimated time frame in which the degradation or outage scenario will occur. In other words, the operationalization phase amounts to building one or more machine learning models or predictive applications. The design of the production run-time inference machine involves three neural networks (NNs), namely a Word-To-Vector NN, a Convolutional NN (CNN), and a Long Short Term Memory (LSTM) NN running back-to-back. At 332, the Word-To-Vector NN is trained and a document vector (i.e., Document-To-Vector) can be generated. At 334, the CNN can be trained to classify a document vector representing a NF failure prediction scenario. At 338, aggregate scores determined by the discovery engine 310 described above, are assembled in a time series fashion to create a matrix of rolling time windows that can be used to train the LSTM.

Upon operationalization of the inference machine 340, the inference machine 340 can analyze real-time events/logs to predict NF failure scenarios, and send early warning signals. In particular, at 342, event documents can be generated by applying trained Word-To-Vector and Document-To-Vector NNs to a real-time sequence of events received as messages, part of an event log, etc. Again, in the context of a SP system architecture 200, event bus 208 may provide the events to be analyzed. Event analysis can be performed at periodic intervals, or on-demand, if desired.

At 344, the trained CNN can be applied to an event document generated at 342 in order to infer the existence of a particular NF failure prediction scenario (which corresponds to one of the selected/validated NF failure prediction scenarios determined during the discovery phase by discovery engine 310. At 346, real-time scoring/weighting of the events/messages is performed. The scoring/weighting of the events/messages received by inference machine 340 may follow the same process as the scoring/weighting of events/messages performed during the discovery phase. At 348, an early warning signal can be sent from inference machine 340 (or inference machine 340 can instruct, e.g., assurance engine 206 that an early warning signal should be sent). The early warning signal itself can be sent to the fulfillment engine 204 in the context of closing the fulfillment/assurance loop, often referred to as the Closed Loop. It should be noted that the early warning signal may include relevant information, such as the type of failure that has been predicted to occur, other data/metadata associated with, e.g., the relevant NF(s), affected system resources, etc. Alternatively, such relevant information may be transmitted to a system administrator or other system agent (human or computerized) in addition to the early warning signal. This relevant information can be gleaned from the received message stream and/or by querying the system or components thereof depending on the information that can be obtained from the message stream itself.

Figure 7:
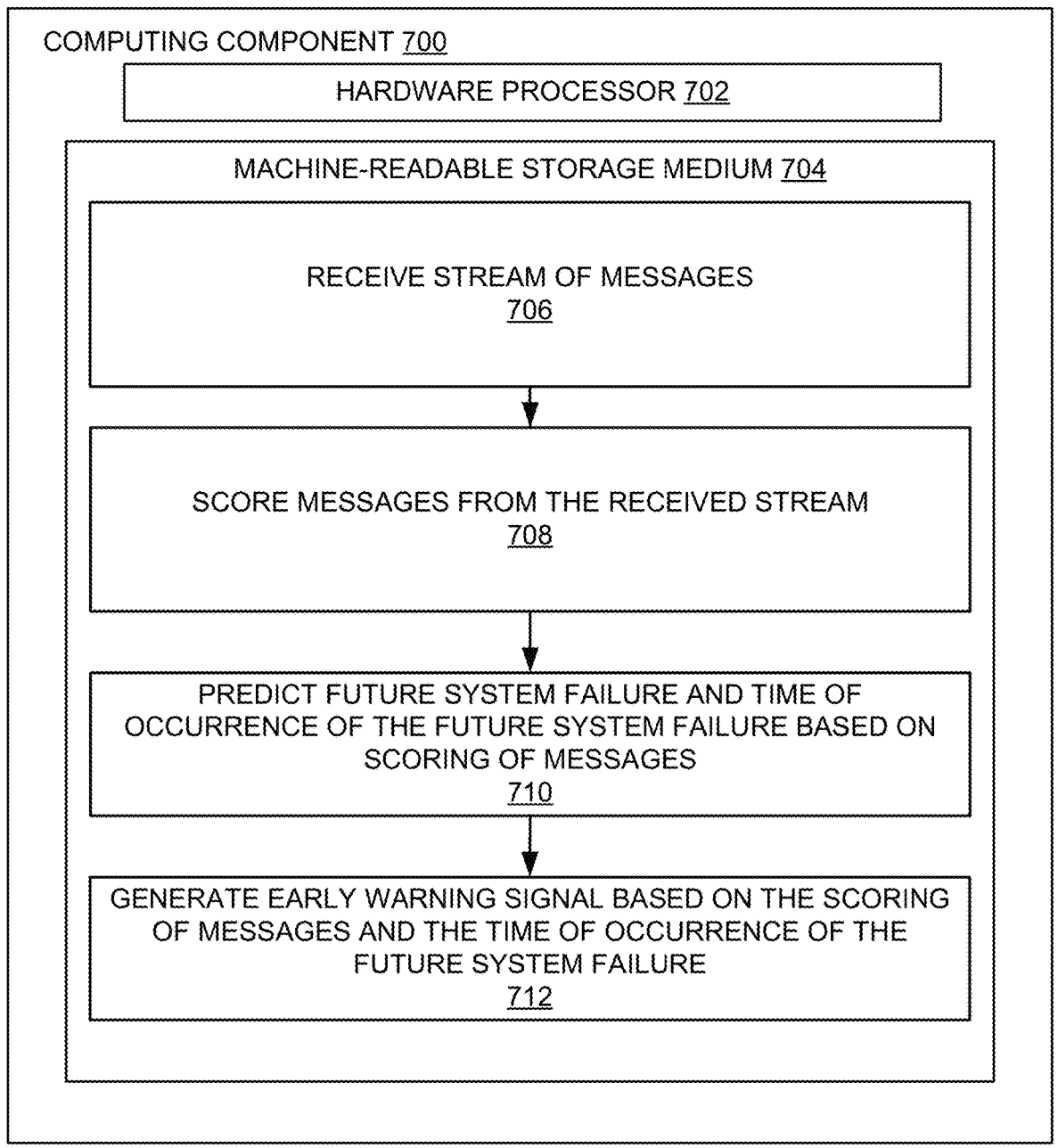
FIG. 7 is a flow chart illustrating example operations that may be performed to effectuate system failure prediction and early warning in accordance with one embodiment of the disclosed technology.

FIG. 7 is a block diagram of an example computing component or device 700 for performing service assurance functions in accordance with one embodiment. Computing component 700 may be, for example, a server computer, a controller, or any other similar computing component capable of processing data, and realizing the functionality of a CSP system or component(s), one or more engines or components in which engines may be implemented, etc. In the example implementation of FIG. 7, computing component 700 includes a hardware processor 702, and machine-readable storage medium 704. In some embodiments, computing component 700 may be an embodiment of a processor.

Hardware processor 702 may be one or more central processing units (CPUs), semiconductor-based microprocessors, and/or other hardware devices suitable for retrieval and execution of instructions stored in machine-readable storage medium, 704. Hardware processor 702 may fetch, decode, and execute instructions, such as instructions 706-712, to control processes or operations for computing parameter dependencies in accordance with one embodiment. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EE- PROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 704 may be encoded with executable instructions, for example, instructions 706-712.

Hardware processor 702 may execute instruction 706 to receive a stream of messages. As described above, the stream of messages may comprise a stream of events, an event log, or other collection of information regarding events, actions, states, or other occurrences in a system, such as a SP system. In some embodiments, the SP system may include a fulfillment engine, an assurance engine, and some bus, such as a Kafka bus over which the stream of messages may be obtained/received. The events can be indicators of a future system failure, such as some system degradation, a system outage, or any other system problem or issue that may need remediation, which can be accomplished via the assurance engine, and in some embodiments via closed loop actions scheduled/executed by the fulfillment engine in conjunction with the assurance engine.

Hardware processor 702 may execute instruction 708 to score messages from the received stream. Again, the messages can correspond to system events that have occurred, and may signal an upcoming system failure. As described above, the system events can be split across time slices of a time horizon, and scores associated with individual system events can be aggregated to create aggregate scores corresponding to events falling within a particular time slice. Due to the nature of system failures, the intensity of system messaging tends to increase the closer a system is to being in a state of failure, going into an outage mode, or otherwise experiencing an undesirable system occurrence.

Hardware processor 702 may execute instruction 710 to predict a future system failure and a time of occurrence of the future system failure based on the scoring of the messages. As noted above, systems/networks tend to experience/create increased messaging/system status reports or updates the closer the system may be to encountering a system failure. Accordingly, the highest aggregate score will correspond to the actual occurrence of the system failure, while generally, a second highest aggregate score will correspond to a time in advance of the occurrence of the system failure. This advance time can be an appropriate time to generate and transmit an early warning signal notifying the system of the impending (predicted) system failure, and information associated with predicted system failure.

Hardware processor 702 may execute instruction 712 to generate an early warning signal based on the scoring of the messages and the time of occurrence of the future system failure. The second highest aggregate score, discussed above, may be a basis for when the early warning signal is sent. As described above, the early warning signal may be sent at precisely the time differential between the time of the second highest aggregate score and the time of the highest aggregate score. In other embodiments, the time at which the early warning signal is sent may be some time before or after that time of the second highest aggregate score. It should be noted that multiple early warning signals may be sent. For example, at some determined/programmed interval (progressive interval), subsequent to an initial early warning signal transmission, one or more subsequent early warning signals may be sent.

As described herein, a sequence of analytical steps may be performed to qualify a list of candidates suitable for use in predicting a failure, and a machine may be prepared that is capable of generating early warning signals. A system effectuating these analytical steps can be applied to NFs (or other enterprise software applications where the number of events/logs describing problem situations tends to be large), needing very limited human intervention. Further analysis of the qualified candidates allows for the identification of the advanced time frame in which an early warning signal can be generated for remediation, either manually by human operators or programmatically by an automation/orchestration engine through closed-loop implementations (e.g. to restart a NF automatically when a failure is predicted).

Network equipment providers (NEPs) tend to propose supervised learning solutions, requiring specific knowledge of their equipment, for troubleshooting network failures, which is only to be expected as NEPs have the expertise and knowledge of the equipment manufactured they themselves manufacture. In contrast, the various embodiments disclosed herein are vendor-agnostic, and do not presume any specific knowledge about the equipment or NF. Further, the discovery (and candidate qualification) phase essentially makes use of standard statistical and unsupervised learning techniques, while the inference (and prediction) phase effectuated by the production run-time machine(s) makes use of supervised deep learning models that were trained/tested during operationalization.

It should also be noted that for most enterprise software applications, the number of distinct/unique event/log messages are much smaller in number than what may typically be encountered with NFs. Typically, a software application having several tens of different distinct events/log messages, or a couple of hundred at best. In contrast, NFs exhibit at least an order of magnitude more number of distinct/unique messages. Thus, in most cases, the labeling of messages and subsequent discovery of a problem, associated with a group of messages in the context of a software application, can be done manually or with some simple unsupervised machine learning. This is not the case with NFs. Essentially, the dimensionality of the problem is an order of magnitude larger in the context of NFs in comparison to application software. Moreover, the topology is not as complex as in a telecommunications context. In telecommunications situations, the set of events/logs corresponding to a problem have also a much deeper and more complex mathematical structure. For example, there are usually a large number of different message types that characterize a problem situation, usually because NFs are made up of NF components that together use up a large number of message types to describe a problem situation. The order in which the messages are reported can point to different problem situations. The number of times a specific message is repeated or occurs can influence the problem situation being characterized. The time difference between the messages can also influence the problem situation being characterized. The time horizon for which message streams need to be analyzed is large, as problem situations manifest themselves over extended periods of time before actually resulting in a non-operation or failing state.

Figure 8:
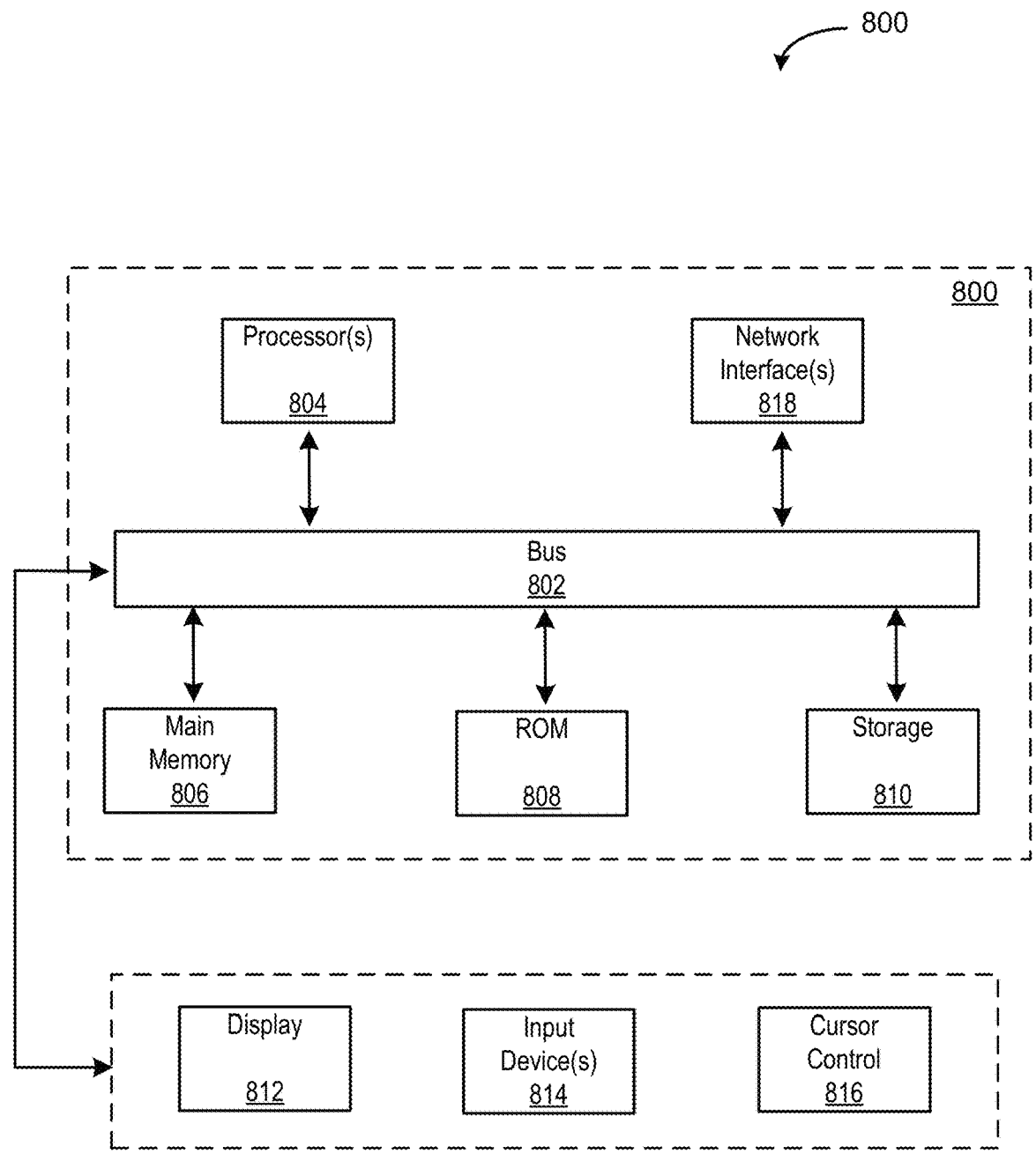
FIG. 8 illustrates an example computing component in which various embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes memory units, such as a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions. Also coupled to bus 802 are a display 812 for displaying various information, data, media, etc., input device 814 for allowing a user of computer system 800 to control, manipulate, and/or interact with computer system 800. One manner of interaction may be through a cursor control 816, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
 a processor; and
 a memory unit operatively connected to the processor and including computer code that when executed, causes the processor to:
  receive a stream of messages generated by one or more network functions (NFs) of the system, wherein the stream of messages characterize an ongoing condition of the one or more NFs;
  perform statistical analysis of the stream of messages, and quantitatively qualify and identify one or more NF failure scenarios capable of indicating future NF failure scenarios;
  based on the received stream of messages and statistical analysis of the stream of messages, generate early warning signals regarding one or more predicted NF failure scenarios comporting with the future NF failure scenarios, the one or more predicted NF failure scenarios being determined based on previously selected NF failure scenario candidates operationalized as production run-time machines executing in real-time on the system.

2. The system of claim 1, wherein the received stream of messages includes a plurality of messages corresponding to different message types, and wherein the computer code that when executed further causes the processor to generate the early warning signals based on a distribution of event counts corresponding to the different message types.

3. The system of claim 2, wherein the memory unit includes computer code that when executed further causes the processor to validate the distribution of event counts corresponding to the different message types, and determine a best fitting probability density function to a probability mass function based on the distribution of the event counts in order to determine the previously selected NF failure scenario candidates.

4. The system of claim 3, wherein the memory unit includes computer code that when executed further causes the processor to estimate a time when to generate the early warning signals by assigning a score to events corresponding to the distribution of event counts using the best fit probability density function.

5. The system of claim 4, wherein the memory unit includes computer code that when executed further causes the processor to partition a time horizon over which at least a portion of the received stream of messages is received into a plurality of time slices.

6. The system of claim 5, wherein the memory unit includes computer code that when executed further causes the processor to calculate an aggregate score based on a plurality of the events occurring in each of the plurality of time slices.

7. The system of claim 6, wherein the memory unit includes computer code that when executed further causes the processor to compute a time difference between a first time corresponding to a highest aggregate score and a second time corresponding to a second highest aggregate score.

8. The system of claim 7, wherein the memory unit includes computer code that when executed further causes the processor to estimate the time when to generate the early warning signals based on the computed time difference.

9. The system of claim 1, wherein the memory unit includes computer code that when executed further causes the processor to train a word-to-vector neural network generating document vectors that apply to event sequences of events from the one or more NFs.

10. The system of claim 9, wherein the memory unit includes computer code that when executed further causes the processor to train a convolutional neural network to classify each of the generated document vectors.

11. The system of claim 10, wherein the memory unit includes computer code that when executed further causes the processor to assemble a time series of aggregate scores determined based on the events from the one or more NFs in a matrix of rolling time windows and train a long short term memory neural network.

12. The system of claim 1, wherein the stream of messages comprises a time-sequenced stream or log of messages.

13. A system, comprising:
a processor; and
a memory unit operatively connected to the processor and including computer code that when executed, causes the processor to:
receive a stream of messages generated by and characterizing an ongoing condition of one or more network functions (NFs);
score messages of the received stream of messages reflecting system failures;
predict, by statistically analyzing the stream of messages, and quantitatively qualifying and identifying system failures capable of indicating future system failures, future system failures and time of occurrence of the future system failures based on the scoring of the messages; and
generate an early warning signal based on the scoring of the messages and the time of occurrence of the future system failures.

14. The system of claim 13, wherein the stream of messages comprises a time-series sequence of events experienced by the one or more NFs of the system, the time-series sequence of events comprising different types of events, and the system comprising a communications service provider (CSP) system.

15. The system of claim 14, wherein the memory unit includes computer code that when executed further causes the processor to validate a histogram of event counts based on the time-series sequence of events, and determine a best fitting probability density function to a probability mass function based on the histogram of the event counts in order to determine NF failure scenario candidates.

16. The system of claim 13, wherein the computer code that when executed causes the processor to score the messages further causes the processor to partition the stream of messages into a plurality of time slices, and to calculate an aggregate score corresponding to events reflected in the received stream of messages.

17. The system of claim 16, wherein the computer code that when executed causes the processor to generate the early warning signal further causes the processor to determine a time in advance of the time of occurrence of the future system failure based on a highest aggregate score and a second highest aggregate score time difference.

18. A communication services provider (CSP) system, comprising:
a fulfillment engine to perform one or more fulfillment actions of the CSP system;
an assurance engine operatively connected to the fulfillment engine to determine one or more remediation actions to correct one or more CSP system failures;
a bus transmitting a log of events occurring on the CSP system, the log of events characterizing an ongoing condition of the CSP system; and
an inference machine analyzing the log of events from the bus to predict future occurrences of the one or more CSP system failures by statistically analyzing the log of events, and quantitatively qualifying and identifying one or more CSP system failure scenarios capable of indicating future occurrences of the one or more CSP system failures, and generate early warning signals in advance of the future occurrences of the one or more CSP system failures based on a distribution of event counts reflected by the log of events, the log of events comprising events of different types.

19. The CSP system of claim 18, wherein the inference machine comprises at least one production run-time machine trained based on analyses regarding events associated with past CSP system failure, the events having been scored relative to a time horizon over which the events occur, the events having been determined to be indicators of the past CSP system failure.

20. The CSP system of claim 19, wherein the inference machine generates the early warning signals based on highest and next highest aggregate scores calculated based on the event scores.

* * * * *